G. R. CORNWALL.
MEANS FOR OPERATING UPON CHARACTER BEARING SURFACES.
APPLICATION FILED APR. 25, 1906. RENEWED JULY 24, 1914.

1,130,798.

Patented Mar. 9, 1915.
4 SHEETS—SHEET 1.

G. R. CORNWALL.
MEANS FOR OPERATING UPON CHARACTER BEARING SURFACES.
APPLICATION FILED APR. 25, 1906. RENEWED JULY 24, 1914.

1,130,798.

Patented Mar. 9, 1915.
4 SHEETS—SHEET 2.

G. R. CORNWALL.
MEANS FOR OPERATING UPON CHARACTER BEARING SURFACES.
APPLICATION FILED APR. 25, 1906. RENEWED JULY 24, 1914.

1,130,798.

Patented Mar. 9, 1915.

Witnesses
Milton Lenoir
Auguste L. Saltzman

Inventor
G. R. Cornwall
By John D. Morgan
Attorney

G. R. CORNWALL.
MEANS FOR OPERATING UPON CHARACTER BEARING SURFACES.
APPLICATION FILED APR. 25, 1906. RENEWED JULY 24, 1914.

1,130,798.

Patented Mar. 9, 1915.
4 SHEETS—SHEET 4.

UNITED STATES PATENT OFFICE.

GEORGE R. CORNWALL, OF RYE, NEW YORK, ASSIGNOR, BY MESNE ASSIGNMENTS, TO JAMES G. COFFIN, TRUSTEE.

MEANS FOR OPERATING UPON CHARACTER-BEARING SURFACES.

1,130,798.  Specification of Letters Patent.  Patented Mar. 9, 1915.

Application filed April 25, 1906, Serial No. 313,629. Renewed July 24, 1914. Serial No. 852,935.

*To all whom it may concern:*

Be it known that I, GEORGE R. CORNWALL, a citizen of the United States, residing at Rye, in the county of Westchester and State of New York, have invented new and useful Improvements in Means for Operating Upon Character-Bearing Surfaces, of which the following is a specification.

The invention relates to the printing art and more especially to machines for operating upon character-bearing surfaces to bring them into relation such that the matter carried thereon may be in the desired final form for reproduction. The invention in some of its features however will be found useful in other connections.

An object of the invention is to provide a machine which will bring characters or lines of characters upon different character-bearing surfaces into registered relation with each other, that is, so that a line will bear the same relation to lines upon other surfaces as it does to the lines upon the same surface with itself in order that in the reproduction the matter may appear as continuous matter with the characters, or lines of characters, in proper relation to each other; to provide such a machine which is adapted to operate upon strips bearing lines of characters; to provide a machine which will register lines of characters and will then retain them in their registered relation; to provide a machine for registering character bearing surfaces or lines of characters upon such surfaces and then attach together such surfaces with the characters or lines in registered relation; to provide a machine which is adapted to register and superpose strips bearing single lines upon strips bearing a series of lines so that the line upon the superposed strip will be in the same relation to the remaining lines upon the other strip as the covered line; to provide such a machine which will register lines upon different surfaces with reference to each other; to provide a machine which will effect the said functions automatically, together with other functions. These and other objects of invention will in part be obvious and will in part more fully appear hereinafter.

The invention consists in the novel parts, improvements, and combinations herein shown and described.

The accompanying drawings, referred to herein and forming a part hereof, illustrate one embodiment of the invention, the same serving in connection with the description herein to explain the principles of the invention.

Of the drawings: Figure 1 is a general perspective view of a machine constructed in accordance with the principles of the invention; Fig. 2 is a front elevation of such a machine. Figs. 5, 6, 7, and 8 are fragmentary details of various parts of the mechanism.

In the typographic art it is frequently desirable to reproduce printed matter by planographic methods and to compose matter for reproduction by such methods and for this purpose such matter is usually composed or printed upon a surface adapted for reproduction by such methods. A surface of the character indicated which is in common use is ordinary transfer paper such as is well known in the art, and consists generally of a sheet carrying a coating upon its surface which is adapted to receive typographic or character impressions of a high quality and which is readily soluble with water, or other suitable solvent. Such a paper is usually made with glycerin and starch as constituents of the coating. With letter-press matter carried upon surfaces of this kind, it is necessary, of course, to get the composed matter into the desired final form before the transfer is made to the final printing plate.

It is contemplated by the present invention to provide a machine whereby revisions, corrections, substitutions, additions, transpositions, or other desired changes in the composed letter-press matter may be effected without handling or marring the impression-surface of the transfer sheet, or other impression-receiving surface, which is to be used for reproduction and without any measuring or calculation on the part of the operator. For this purpose the present invention, as hereinbefore indicated, contemplates providing means whereby strips or other surfaces bearing characters or lines of characters may be registered with reference to each other so that the characters or lines of characters upon the surface or strip will be in registered relation and also means for fixing the strips in position with reference to each other so as to preserve the characters thereon in such registered relation. A convenient manner of fixing the said strips in position is by attaching them to each other in a suitable manner and in the present embodiment of the invention the attaching is effected by causing the strips to adhere together.

While the illustrated embodiment of the invention is adapted to act upon strips bearing any desired number of lines of characters, the invention is further adapted for severing a single line or a plurality of lines from one strip and bringing such line or lines into registered relation to the lines of characters upon another strip and then attaching the strips together so that the strips may be fixed in position with reference to each other in order to preserve the characters or lines in such registered relation. Other features of the invention also will be set forth herein.

Referring to the illustrated embodiment, it will be found to comprise a plurality of members constructed and arranged to support and feed the character-bearing or line-bearing strips. The said supporting and feeding members are shown herein in the form of cylinders, one cylinder being indicated by the reference numeral 1 and another by the reference numeral 2, such cylinders being shown as two in number in the said illustrated embodiment. These cylinders are mounted in a suitable relation to each other and are shown as being rotatably mounted in the frame structure of the machine, which may be of any convenient or suitable form.

Registering devices for the purpose of positioning the character-bearing or line-bearing strips with reference to each other in order to register the characters or lines thereon are contemplated by the invention and, so far as concerns some features of the invention, such registering means may be of any desired form. According to other features of the invention, however, a machine is contemplated which is adapted to operate upon character-bearing or line-bearing strips which have registering means adapted to coöperate with registering means carried by the supporting and feeding members. The illustrated embodiment is constructed and arranged to comprise such means, and is further constructed and arranged to coöperate with line-bearing strips which have registering means in the form of registering perforations at each end of each line of characters carried upon said strip. The cylinder 1 is therefore shown as being provided with registering pins 3. The said pins in this embodiment are further shown as being movably mounted peripherally of the cylinder 1 and as being normally yieldingly held projecting from the surface of the cylinder 1 by suitable means, such as springs 4 shown as being located beneath the pins. According to certain features of the invention also, it is contemplated to provide the said cylinder with longitudinal kerfs or slots 5 for a purpose which will be explained hereinafter.

Figure 9:
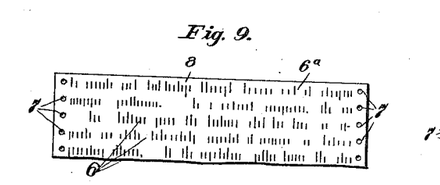
Figs. 9, 10 and 11 are for the purpose of illustrating one use or operation of the machine.

One form of character-bearing or line-bearing strip with which the machine is designed to coöperate is shown in Fig. 9 of the drawings wherein the characters are shown as arranged in line series 6 and registering holes 7 are shown at each end of each line. With the supporting and feeding means and with the line-bearing sheet of the kind just described, the registering pins 3 are separated from each other upon the surface of the cylinder a distance equal to the line space unit distances between the lines 6 and likewise between the registering holes 7 upon the line-bearing sheet 8.

Suitable means for actuating the supporting and feeding cylinders are contemplated by the invention. The form of such means illustrated in connection with the present embodiment comprises a crank 9 adapted to rotate the cylinder 1 so as to positively feed the strip by line space units, that is, so that the lines upon the line-bearing strip will always bear the same relation to the mechanism. The form of such means herein illustrated further comprises a ratchet wheel 10 and a spring detent 11 which coöperate with the crank 9 in a manner which will be well understood to give the positive feed by line space units desired.

A similar device for a similar purpose is shown in connection with the supporting and feeding cylinder 2 the crank being indicated by the reference numeral 12, the ratchet by the numeral 13, and the pawl by the numeral 14. It will be thus understood that the line-bearing strips may constantly be kept in a relation to each other corresponding to the line space units. It will be further understood that the cylinders 1 and 2 move independently of each other so that any desired extent of one line-bearing strip may be fed up independently of the other, so as to bring them into any relation desired.

A device for conveying a character-bearing or line-bearing strip, or a line portion from such a strip, or a portion bearing a plurality of lines from such a strip, to another character-bearing or line-bearing strip is contemplated by certain features of the invention. In the present embodiment, the form of such means shown comprises a movable carriage 15 shown as being longitudinally slidable upon guide rods 16 so as to bring it into operative relation with each of the supporting and feeding cylinders 1 and 2. For ease of running the carriage is shown as being provided with rollers 17 traveling upon, and with steadying rolls 18 underneath, the rods 16. Suitable adjusting devices for controlling the movement and positioning of the carriage 15 are provided, being shown herein in the form of adjustable screws 19.

The carriage is provided with means adapted to enter into registered or positive relation with the line-bearing strips upon each of the cylinders 1 and 2, said means being also utilized in this embodiment for carrying the strip from one roll to the other. In this embodiment the form of such means illustrated comprises pins 20. The said pins 20 are herein shown as having a cup-shaped depression in the end thereof, the heads of the pins 3 being shaped to fit into the said depressions in such manner as to bring the pin 20 into exact line with the pin 3 which may be then underneath it. The cylinder 2 is also provided with registering pins 21 which have their ends shaped in a manner similar to the ends of the pins 3 and for the same purpose. As herein shown the pins 21 are set solidly into the cylinder 2.

Figure 3:
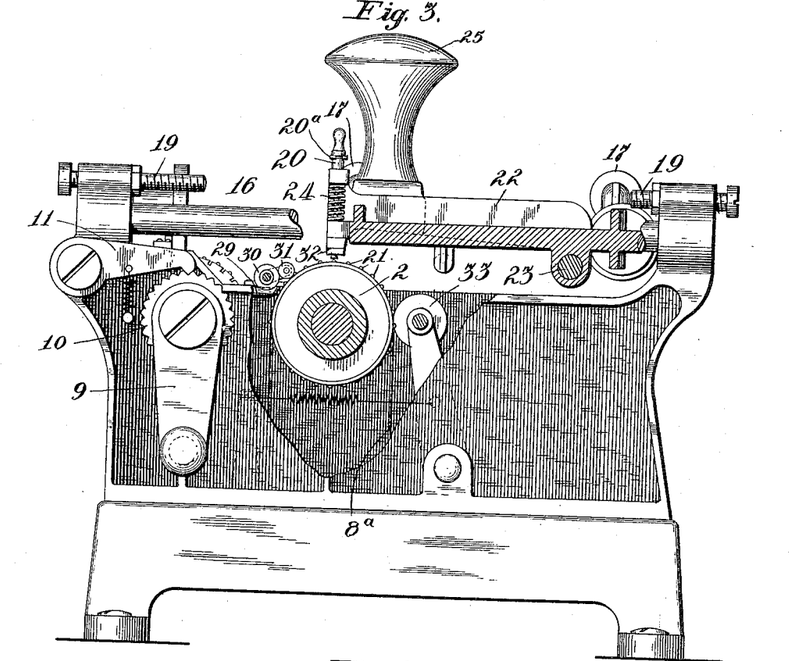
Fig. 3 is an end elevation, partly in section, with parts broken away.
Figure 4:
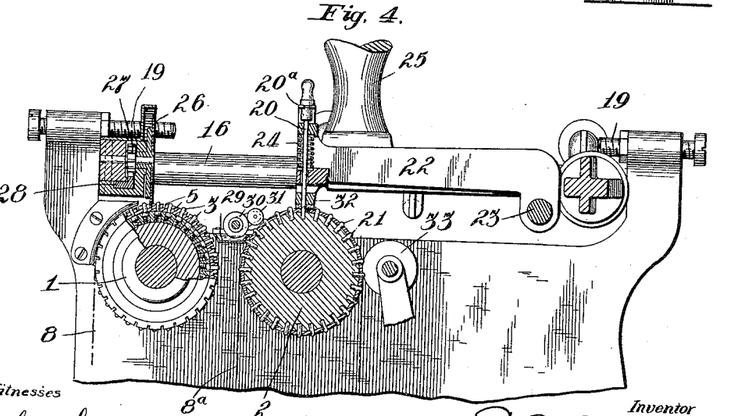
Fig. 4 is a partial sectional end elevation along the line A—B of Fig. 2.

In addition to the carriage 15 being movable slidably along the guide rods 16 a portion therof, indicated by the reference numeral 22, is further angularly movable about pintles 23 forming a part of the carriage 15. The pins 20 are carried in the said angularly movable portion 22 and suitable means are provided so that as the carriage is slid along the pins 20 will normally clear the pins 3 and 21 but will permit the part 22 to swing downward to engage the said pins 3 and 21. Any suitable or convenient means may be used for this purpose, but as herein shown springs 24 are employed. The said springs coact with the surrounding parts, as above stated, to normally preserve the angularly moving portion 22 of the carriage 15 clear of the registering pins upon the cylinders 1 and 2 as the carriage slides along, this position of the parts being clearly shown in Fig. 3 of the drawings. The pins 20 are yieldably carried in the angularly moving part 22 of the carriage 15, the said pins as shown being carried by springs 20ª attached to the part 22, for a purpose which will be hereinafter set forth. Any suitable means for moving the carriage 15 may be provided and the form of such means herein shown comprises a handle 25.

It will be frequently found convenient to sever a line-bearing sheet into line portions or a portion bearing a plurality of lines so that the said portions may be carried into register with, and then attached to the other character-bearing or line-bearing strip. Any desired form of such severing means, so far as concerns many features of the invention, may be provided. As herein shown the said form comprises a rotary knife 26 having a pinion 27 attached thereto, the knife 26 working in the slots or kerfs 5 in the cylinder 1. The knife 26 and its pinion 27 are slidable longitudinally of the cylinder and by reason of the pinion 27 meshing with a stationary rack 28 a rotary motion is communicated to the knife 26 during its sliding movement.

Figures 1, 6, 7:
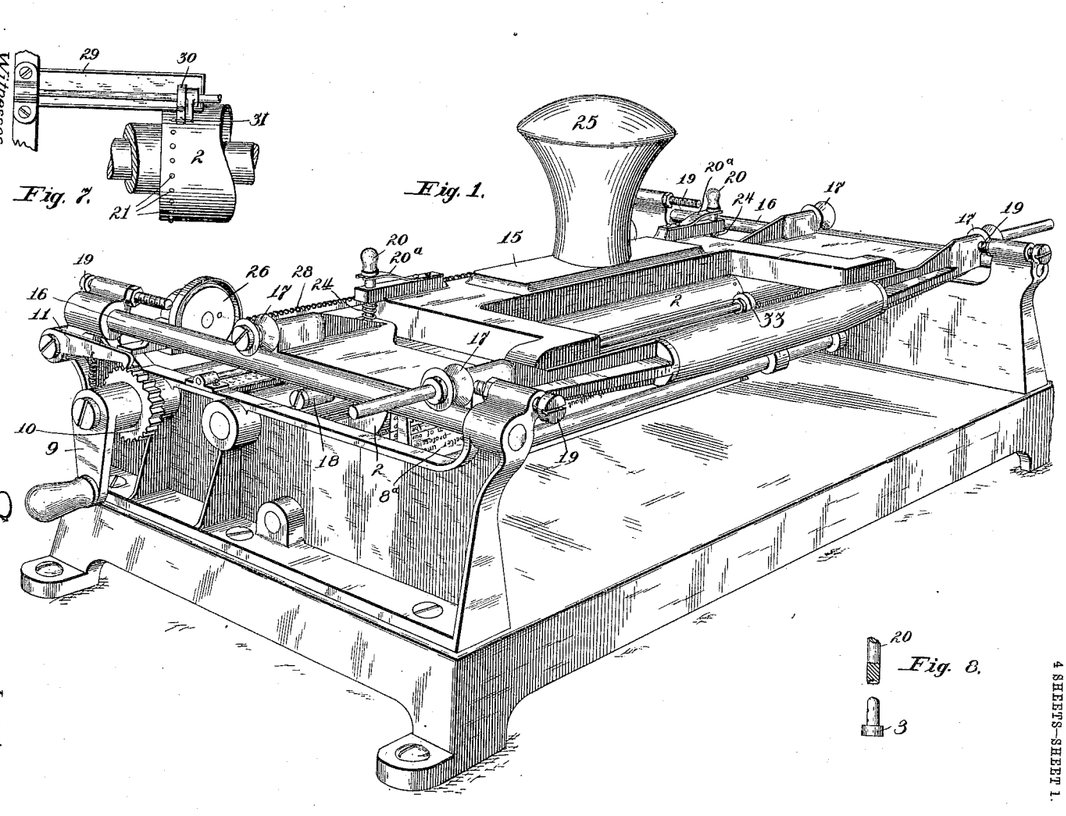
Figures 2, 5, 6:
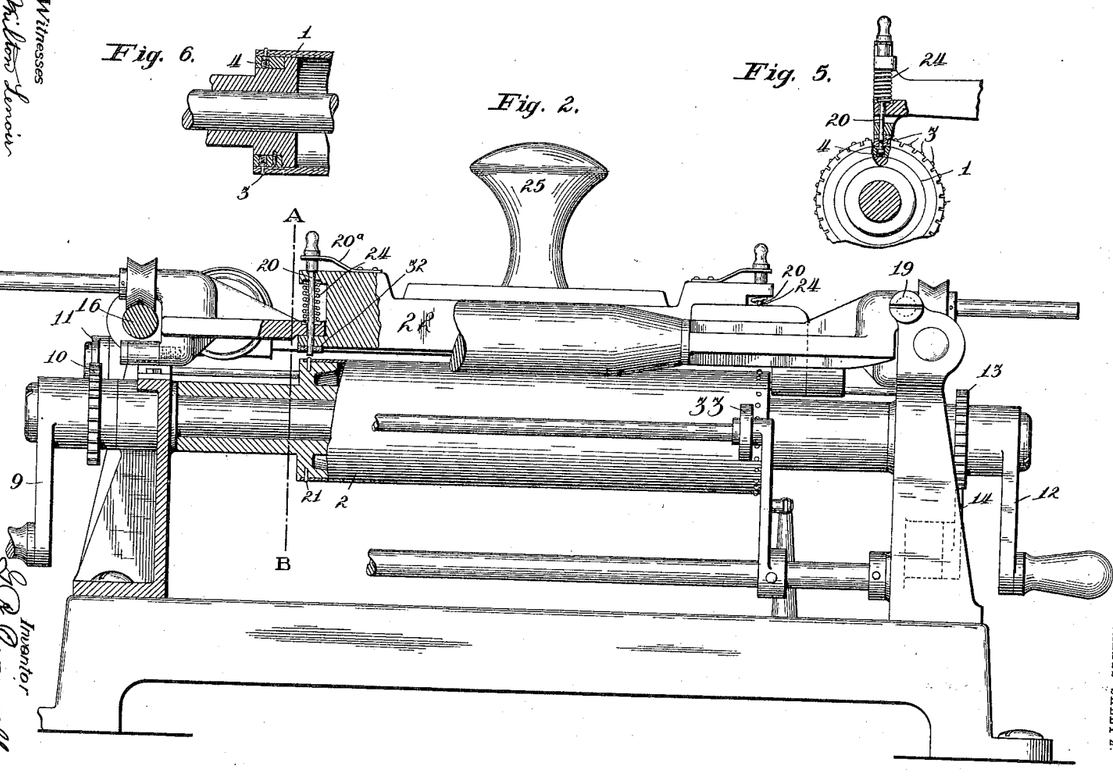

While, as concerns many features of the invention, any suitable means may be provided for keeping the character-bearing or line-bearing strips in registered relation with each other, in the present embodiment, as previously indicated, a form of such means is shown adapted to cause them to adhere to each other. Said form of means comprises a water pan 29 having rollers 30 and 31 adapted to slightly moisten at each edge the surface of the line-bearing strip of transfer paper 8ª which is supported and fed over the cylinder 2. There is also shown in this embodiment pressure pads 32, carried upon the angularly moving part 22 of the carriage, through which the pins 20 pass. The said pads are shown of such shape, as will be seen by reference to Fig. 2 of the drawings, so that pressure is applied to the strip without contacting with the line of characters. If desired, pressure rolls 33 may also be provided for giving a final pressure to the strips so as to cause them to adhere more strongly.

Figure 10:
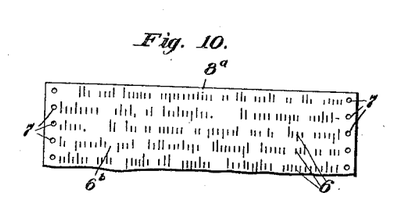
Figure 11:
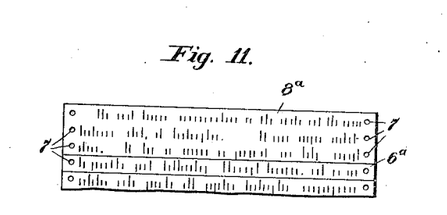

The mode of operation of the herein-described mechanism is as follows: The strips of transfer paper, if this kind of character-bearing or line-bearing surface is used, are brought into engagement by means of the registering holes 7 with the registering pins 3 and 21 of the cylinders 1 and 2 respectively. The said strips are then positively fed by rotation of the cranks 9 and 12 respectively. By way of example, it will be assumed the particular operation desired to be performed is the correction of a line by substituting a correct line from the strip 8 shown in Fig. 9, to the strip 8ª shown in Fig. 10. The correct line will be indicated by the reference numeral 6ª upon the strip 8 and the incorrect line by the reference numeral 6ᵇ being on the strip 8ª. In such case the line 6ª will be cut from the strip 8 and superposed upon the line 6ᵇ upon the strip 8ª. Accordingly, the crank 9 will be rotated so as to bring the line 6ª into proper position upon the cylinder 1, and the crank 12 will be rotated to bring the line 6ᵇ into proper position upon the cylinder 2. As the feed is by line space units, this may be quickly and accurately accomplished. The carriage 15, by means of the handle 25, may be then moved along the rods 16 until the pins 20 are in register with the pins 3 which engage the holes 7 in register with the line 6ª on strip 8 carried in cylinder 1, which will be when it impinges upon the screws 19. The angularly moving part 22 will then be swung downwardly, and the pins 20 will come in contact with the said pins 3 which are in alinement with the line of characters 6ª. The springs 20ª are stronger than the springs 4 beneath the pins 3 and consequently as the part 22 is forced downwardly the pins 20 will force the pins 3 beneath the surface of the cylinder 1 and in so doing the pins 20 will enter into the registering holes 7 which are in alinement with the line 6ª. The knife 26 may be then passed across the strip 8 and the line portion carrying the line 6ª will then be severed from the line-bearing strip 8. Upon releasing the handle 25 the angularly moving portion 22 will then move upwardly, the line portion bearing the line 6ª remaining upon the pins 20 by frictional engagement. The carriage will then be moved backwardly until the pins 20 are above the pins 21 which engage the holes 7 in register with the line 6ᵇ on cylinder 2, which will be when the carriage impinges with the screws 19 at the other end of its path of travel. Upon again moving the part 22 downwardly against its springs 24, the pins 20 will come in contact with the pins 21. The pins 21 however being set solidly in the cylinder 2, it will be found upon continued movement of the part 22 that the pins 20 will move relatively to the part 22 by the yielding action of the springs 20ª and the pressure pads 32 contacting with the said line portion 6ª upon the pins 20 will force it downwardly from the pins upon the pins 21 in register therewith, and the holes 7 in the said line portion will then pass over the pins 21 and bring the line 6ª in absolute register over the line 6ᵇ. The moistening mechanism 29, 30 and 31 having moistened the coating upon the transfer surface the line portion bearing the line 6ª will, when pressed by the pads 32, adhere to the strip 8ª. Upon releasing the handle 25 the angularly moving part 22 will resume its normal position. The cranks 9 and 12 may then be rotated to bring the surfaces into position for the next operation.

It will be understood that while this operation has been described in connection with a single line that a plurality of lines may be brought into registry from two strips in a like manner and also that the lines may be brought into register with each other without superposition of one line upon another as will be obvious. In fact, any desired space could be left blank upon one strip and the other strip then attached thereto so that the space between the strips would be in an integral number of line space units and any matter desired could be afterward inserted by use of the registering machine or otherwise. The cutting devices could then be brought into action to sever the strip at any point desired.

From all the foregoing it will be understood that a mechanism has been provided realizing the objects of invention and the advantages herein set forth, together with other objects and advantages.

It will be understood also that the machine may be used with other surfaces than transfer surfaces and may be used in processes other than those for securing planographic printing plates.

The invention, in its broader aspects, is not limited to the particular constructions shown, nor to any particular constructions by which it has been or may be carried into effect, as many changes may be made in the construction without departing from the main principles of the invention and without sacrificing its chief advantages.

What I do claim as my invention and desire to secure by Letters Patent, is:

1. A machine, adapted to operate upon character-bearing strips, including in combination means for registering a plurality of strips so that the characters upon the said strips will be in registered relation with each other, and means for fixing the said strips in position with reference to each other so as to preserve the characters thereon in such registered relation.

2. A machine, adapted to operate upon character-bearing surfaces, including in combination means for registering a plurality of strips so that the characters upon the several strips will be in registered relation with each other, and means for attaching the strips together to preserve the characters in the said relation.

3. A machine adapted to operate upon strips bearing lines of characters, including in combination means for registering a plurality of strips so that the lines of characters upon the several strips will be in registered relation with each other, and means for fixing the said strips in position with reference to each other so as to preserve the characters thereon in such registered relation.

4. A machine adapted to operate upon strips bearing lines of characters, including in combination means for registering a plurality of strips so that the lines of characters upon the several strips will be in registered relation with each other, and means for attaching the strips to each other to preserve the lines of characters in the said relation.

5. A machine adapted to operate upon strips bearing lines of characters including in combination means for supporting a line-bearing strip, means for supporting a second line-bearing strip, means for moving one of said strips relatively to the other so that the lines of characters upon the two strips will be brought into registered relation, and means for fixing said strips in position to preserve the said lines in such relation.

6. A machine adapted to operate upon strips bearing lines of characters including in combination means for supporting a line-bearing strip, means for supporting a second line-bearing strip, means for moving one of said strips relatively to the other so that the lines of characters upon the two strips will be brought into registered relation, and means for attaching the said strips together to preserve the said lines in such relation.

7. A machine adapted to operate upon strips bearing lines of characters including in combination means for supporting a plurality of line-bearing strips, means for severing a portion bearing a line of characters from one of said strips, means for positioning the said severed line portion with reference to another line-bearing strip so that the line upon the line portion will be in register with the lines upon the other strip, and means for attaching the said line portion to the said other strip.

8. A machine adapted to operate upon strips bearing lines of characters including in combination means for holding a strip bearing a line of characters, means for registering said line strip with reference to a strip bearing lines of characters, and means for attaching the line strip to the strip bearing the lines of characters in such registered relation.

9. A machine adapted to operate upon strips bearing lines of characters including in combination means for holding a line-bearing strip, and means for imposing a strip bearing a line of characters upon a line of characters carried upon the line-bearing strip in such position that the line of characters upon the line strip will bear the same relation to the other lines of characters upon the line-bearing strip as the covered line of characters.

10. A machine adapted to operate upon strips bearing lines of characters and having registering devices in definite relation to said lines of characters, said machine including in combination means adapted to coact with the registering means upon the said strips to bring the lines of characters upon the respective strips into register with each other, and means for fixing the said strips in position with reference to each other so as to preserve the lines of characters in such registered relation.

11. A machine adapted to operate upon strips bearing lines of characters and having registering devices in definite relation to said lines of characters, said machine including in combination means adapted to coact with the registering means upon the said strips to bring the lines of characters upon the respective strips into register with each other, and means for attaching the said strips together with the lines of characters in such registered relation.

12. A machine adapted to operate upon strips bearing lines of characters and having registering devices in definite relation to said lines of characters, said machine including in combination means for severing a line portion from one of said strips, and means adapted to co-act with the registering devices carried by the strips for positioning the said line portion with reference to the other line strip so that the line of characters thereon will be in register with the lines upon the said line strip, and means for attaching the said line portion to the line strip.

13. A machine adapted to operate upon strips bearing lines of characters and having registering devices in definite relation to said lines of characters, said machine including in combination holding means for a line-bearing strip, said holding means having registering devices constructed and arranged to coöperate with the registering devices upon the line strip, holding means for a second line-bearing strip also having registering means adapted to coöperate with the registering devices upon its line strip, and means adapted to co-act with all the said registering means to bring one or more lines of characters upon one line-bearing strip into register with the lines of characters upon the other character-bearing strip, and means for fixing them in registered relation.

14. A machine adapted to operate upon strips bearing lines of characters and having registering devices in definite relation to said lines of characters, said machine including in combination holding means for a line-bearing strip, said holding means having registering devices constructed and arranged to coöperate with the registering devices upon the line strip, holding means for a second line-bearing strip also having registering means adapted to coöperate with the registering devices upon its line strip, and means adapted to co-act with all the said registering means to bring one or more lines of characters upon one line-bearing strip into register with the lines of characters upon the other character-bearing strip, and means for attaching said strips together so as to preserve said lines of characters in such registered relation.

15. A machine adapted to operate upon strips bearing lines of characters and having registering devices in definite relation to said lines of characters, said machine including in combination holding means for a line-bearing strip, said holding means having registering devices constructed and arranged to coöperate with the registering devices upon the line strip, holding means for a second line-bearing strip also having registering means adapted to coöperate with the registering devices upon its line strip, means for severing a line portion from one of said strips, and means for co-acting with the registering devices upon the holder for the said line strip for bringing the line upon said line portion into register with the lines upon the other line strip, and means for attaching the said line portion to the said last-mentioned line strip.

16. A machine adapted to operate upon strips bearing lines of characters having registering holes in definite relation to the lines of characters upon the strip, said machine including in combination a supporting member for said strip having pins adapted to project through the registering holes in the strip, a second supporting member for a line-bearing strip having registering pins adapted to project through the registering holes in its strip, and a movable registering device constructed and arranged to co-act with the said strip-supporting members and the registering holes in their strips to bring a line or lines of characters upon one strip into registered relation with a line or lines of characters upon the other strip, and means for fixing the said strips with reference to each other with their lines of characters in such registered relation.

17. A machine adapted to operate upon strips bearing lines of characters having registering holes in definite relation to the lines of characters upon the strip, said machine including in combination a supporting member having pins adapted to project through the registering holes in the strip, a second supporting member having registering pins adapted to project through the registering holes in its strip, and a movable registering device constructed and arranged to co-act with the said strip-supporting members and the registering holes in their strips to bring a line or lines of characters upon one strip into registered relation with a line or lines of characters upon the other strip, and means for attaching the said strips to each other with their lines of characters in such registered relation.

18. A machine adapted to operate upon strips bearing lines of characters having registering holes in definite relation to the lines of characters upon the strip, said machine including in combination a supporting member for said strip having pins adapted to project through the registering holes in the strip, a second supporting member for a line-bearing strip having registering pins adapted to project through the registering holes in the strip, a movable carrier having pins adapted to pass into alinement with the registering pins upon the said holders for the purpose of receiving the strip from the registering pins on one supporting member and for delivering it on to the registering pins upon the other supporting member, the said carrier also having means for pressing the said strip into contact with the strip carried by the last-named supporting member.

19. A machine adapted to operate upon strips bearing lines of characters having registering holes at each end of the lines of characters each in definite relation to its line, said machine including in combination a supporting and feeding member for a line-bearing strip, registering pins carried by said supporting and feeding member so as to project through the holes in the strip at each end of the lines, another supporting and feeding member for another line-bearing strip, registering pins carried by said last-mentioned supporting and feeding member so as to project through the holes in the strip at each end of the lines, a movable carrier having pins adapted to be moved into register with the pins upon one of the said supporting and feeding members to receive a line-bearing strip therefrom and for then moving into register with the registering pins upon the other supporting and feeding member to deliver the line strip thereto, and means for pressing the line strip carried by the said carrier into position upon the line-bearing strip carried by the last-mentioned supporting and feeding member.

20. A machine adapted to operate upon strips bearing lines of characters having registering holes at each end of the lines of characters each in definite relation to its line, said machine including in combination a supporting and feeding member for a line-bearing strip, registering pins carried by said supporting and feeding member so as to project through the holes in the strip at each end of the lines, means for severing a portion of the strip carried by said supporting and feeding means, another supporting and feeding member for another line-bearing strip, registering pins carried by said last-mentioned supporting and feeding member so as to project through the holes in the strip at each end of the lines, a movable carrier adapted to be moved into register with the pins which engage the severed portion of the line-bearing strip upon the first-mentioned supporting and feeding member to receive said severed portion, and for then moving into register with the registering pins upon the other supporting and feeding member, said carrier also having means for impressing said severed portion on to the line-bearing strip carried by the said second supporting and feeding member.

21. A machine adapted to operate upon strips bearing lines of characters, including in combination a plurality of means for supporting line-bearing strips, means for severing a portion from one of said strips, means for bringing the said severed portion into a position so that the line or lines thereon will register with the lines of characters upon another line-bearing strip, means for applying an adhesive to a line-bearing strip, and means for pressing the severed portion on to the said other line-bearing strip.

22. A machine adapted to operate upon strips bearing lines of characters having registering holes in definite relation to the lines of characters upon the strip, said machine including in combination a rotatable cylinder for carrying a line strip, said cylinder being provided with registering pins adapted to project through the holes in the line-bearing strip, and means for rotating said cylinder so as to positively feed the said strip by line space units.

23. A registering machine adapted to operate upon strips bearing lines of characters having registering holes in definite relation to the lines of characters upon the strip, said machine including in combination a plurality of rotatable cylinders each constructed and arranged to carry a line strip, and having registering pins adapted to engage the registering holes in the line strip, means for rotating one of said cylinders so as to positively feed its strip by line space units, and means for independently rotating another of said cylinders so as to cause it to positively feed its strip by line space units.

24. A registering machine adapted to operate upon strips bearing lines of characters and having registering holes in definite relation to the lines of characters upon the strip, said machine having a supporting and feeding cylinder for a line-bearing strip, said supporting and feeding cylinder being provided with a row of radially movable pins adapted to move into engagement with the registering holes in the strip carried by the said cylinder or to move inwardly out of engagement with the said holes.

25. A registering machine adapted to operate upon strips bearing lines of characters and having registering holes in definite relation to the lines of characters upon the strip, said machine having a supporting and feeding cylinder for a line-bearing strip, said supporting and feeding cylinder being provided with a row of radially movable "spring-pressed" pins adapted to move into engagement with the registering holes in the strip carried by the said cylinder or to move inwardly out of engagement with the said holes.

26. A machine adapted to operate upon strips bearing lines of characters and having registering holes in definite relation to the lines of characters upon the strip, said machine having a supporting and feeding cylinder for a line-bearing strip, said supporting and feeding cylinder being provided with a row of radially movable spring-pressed pins adapted to move into engagement with the registering holes in the strip carried by the said cylinder or to move inwardly out of engagement with the said holes, said cylinder also having a series of longitudinal slits in the surface thereof.

27. A machine adapted to operate upon strips bearing lines of characters and having registering holes in definite relation to the lines of characters upon the said strip, said machine including in combination a supporting and feeding cylinder for a line-bearing strip, said supporting and feeding cylinder being provided with a row of radially movable, spring-pressed pins adapted to move into engagement with the registering holes in the strip carried by the said cylinder or to move inwardly out of engagement with the said holes, said cylinder also having a series of longitudinal slits in the surface thereof, and a cutting member adapted to coöperate with the grooves in the said cylinder for the purpose of severing the line-bearing strip.

28. A machine adapted to operate upon strips bearing lines of characters and having registering holes in definite relation to the lines of characters upon the strip, said machine including in combination a cylinder for supporting and feeding a line-bearing strip, said cylinder having longitudinal slits therein, spring-pressed, radially movable registering pins carried in said cylinder in position for engaging the holes in the line-bearing strip, a cutting device adapted to coöperate with said slits to sever the line-bearing strip, another cylinder adapted to support and feed a line-bearing strip, fixed registering pins in the said cylinder for engaging the registering holes in the line-bearing strip, a slidable and angularly movable carriage carrying pins adapted to register the spring-pressed pins carried by the said first-mentioned cylinder in order to receive the severed portion of the line-bearing strip therefrom, and for then passing into registering position with the registering pins upon the said second cylinder while carrying the said severed portion of the line-bearing strip, and means upon said carriage for pressing the said severed portion down upon the line-bearing strip carried by the said second cylinder.

29. In a machine operating upon strips of paper, means for carrying a strip of paper, means for carrying a second strip of paper, and means coöperating with said strips for attaching one strip to the other in a definite predetermined relation.

30. A machine of the class described adapted to operate upon a plurality of strips each having a line of characters thereon and each strip having also registering means in definite relation with such lines of characters, said machine having in combination devices coöperating respectively with the registering devices on the said strips for bringing one line of characters on one strip into a predetermined position with respect to the line of characters on the other strip to be attached thereto.

31. A machine of the class described adapted to operate upon a plurality of strips each having a line of characters thereon and each strip having also registering means in definite relation with such lines of characters, said machine having in combination devices coöperating respectively with the registering devices on the said strips for bringing one line of characters on one strip into a predetermined position with respect to the line of characters on the other strip and means for attaching the strips together.

32. A machine of the class described adapted to operate upon a strip having a plurality of lines of characters thereon and registering means in definite relation to said lines of characters, and upon another strip having a line of characters and registering means in definite relation to said line of characters, and having in combination devices coöperating with said registering means to bring said line of characters on said last mentioned strip into the same relations with the lines of characters on the other strip as they bear to each other.

33. A machine of the class described adapted to operate upon a strip having a plurality of lines of characters thereon and registering means in definite relation to said lines of characters, and upon another strip having a line of characters and registering means in definite relation to said line of characters, and having in combination devices coöperating with said registering means to bring said line of characters on said last mentioned strip into the same relations with the lines of characters on the other strip as they bear to each other, and means for attaching the strips together in that relation.

34. A machine of the class described adapted to operate upon two character bearing strips each strip having lines of characters thereon said lines being in definite relation to each other, each of said strips having also registering devices in definite relation to the line of characters thereon, having in combination means for severing from one strip a portion bearing a line of characters, and means coöperating with the registering devices on said severed portion and upon the other strip for bringing the line of characters on said severed portion into the same relation with the lines of characters on the other strip that said lines of characters on said other strip bear to each other.

35. A machine of the class described adapted to operate upon two character bearing strips, each strip having lines of characters thereon, said lines being in definite relation to each other, each of said strips having also registering devices in definite relation to the lines of characters thereon, having in combination means for severing from one strip a portion bearing a line of characters, means coöperating with the registering devices on said severed portion and upon the other strip for bringing the line of characters on said severed portion into the same relation with the lines of characters on the other strip that said lines of characters on said other strip bear to each other, and means for attaching said severed portion to said other strip with the lines of characters in said relation.

In testimony whereof I have signed my name to this specification in the presence of two subscribing witnesses.

GEORGE R. CORNWALL.

Witnesses:
   JOHN D. MORGAN,
   CLARA PHILLIPS.

Copies of this patent may be obtained for five cents each, by addressing the "Commissioner of Patents, Washington, D. C."